United States Patent [19]

Vastel

[11] 4,171,482

[45] Oct. 16, 1979

[54] MASS SPECTROMETER FOR ULTRA-RAPID SCANNING

[75] Inventor: Jean Vastel, Courbevoie, France

[73] Assignee: CAMECA, Courbevoie, France

[21] Appl. No.: 864,702

[22] Filed: Dec. 27, 1977

[30] Foreign Application Priority Data

Dec. 31, 1976 [FR] France ............................... 76 39720

[51] Int. Cl.[2] ......................... B01D 59/44; H01J 39/34

[52] U.S. Cl. .................................... 250/296; 250/298; 250/299

[58] Field of Search ............... 250/281, 282, 294, 295, 250/296, 297, 298, 396, 397

[56] References Cited

U.S. PATENT DOCUMENTS

| | | | |
|---|---|---|---|
| 3,194,961 | 7/1965 | Wald et al. | 250/296 |
| 3,475,604 | 10/1969 | Noda et al. | 250/295 |

*Primary Examiner*—Bruce C. Anderson
*Attorney, Agent, or Firm*—Cushman, Darby & Cushman

[57] ABSTRACT

The invention relates to a mass spectrometer for rapid scanning. A magnetic sector focuses a collimated beam containing the various ion species in a focal plane. The focused beams reach this focal plane at an angle of 45°. The beams emerging from this focal plane are refocused in an electrostatic deflector having parallel plates. One of these plates is provided with a slit through which the beams are received. Scanning is brought about by varying the voltage applied to the electrostatic deflector.

4 Claims, 1 Drawing Figure

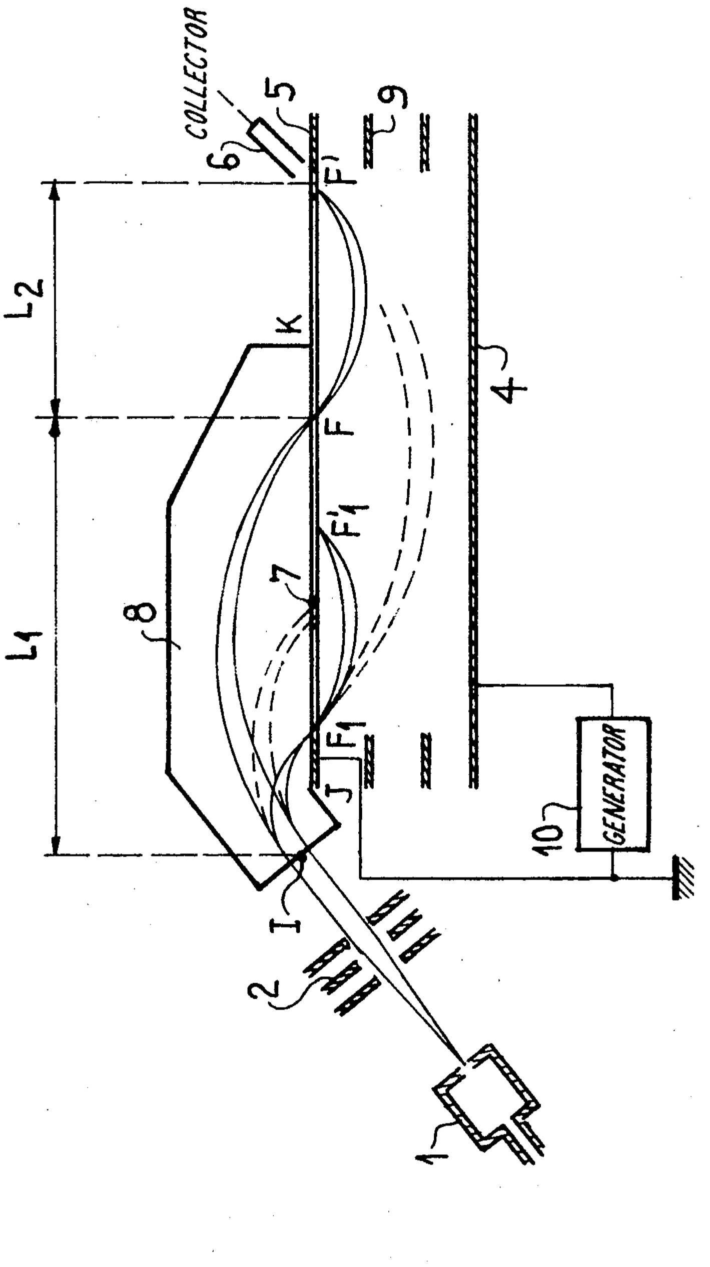
COLLECTOR
GENERATOR
$L_1$
$L_2$
1
2
4
5
6
7
8
9
10
I
J
K
F
F'
$F_1$
$F'_1$

MASS SPECTROMETER FOR ULTRA-RAPID SCANNING

The invention relates to an improvement to mass spectrometers for ultra-rapid scanning.

In many cases of analysis by mass spectrometry, it is desirable to reduce the time required for analysis, e.g. because the composition of the sample varies in time or because the sample is available for a very short time only.

Theoretically, a simple means of reducing the duration of the analysis is to simultaneously collect the various categories of ions simultaneously, with a plurality of collectors. However, simultaneous collection systems can contain only a limited number of collectors, which cannot be placed very close to one another and therefore cannot collect ions having very similar masses. It is also difficult to use highly sensitive collectors, owing to their bulk.

The second method (to which the invention refers) is rapid scanning of the spectrum.

The known methods are as follows:

(a) Rapid scanning of the spectrum by varying the magnetic field of a magnetic sector.

(b) Scanning the spectrum by varying the acceleration voltage of ions sent to a magnetic sector, and (c) Scanning the spectrum by varying the voltage of a quadrupolar filter.

Scanning by rapidly varying the magnetic field is difficult since, if it corresponds to a variation in mass from one to ten units in a second or less, a laminated core magnetic circuit and a very high control power are required.

The disadvantage of varying the energy of the ions is that such method results in a considerable variation in sensitivity along the mass range, so that the ratio of the maximum to the minimum mass is limited in practice to a value of 5 to 10.

Constant-frequency voltage scanning of a quadrupolar filter can be rapid even though there is a limit to the rate of varying the voltage at the terminals of a high-frequency circuit having a high quality factor. The device in question uses high HF voltages (5 to 10 kV peak) and of course lets through only one ion species at a time. In addition, a d.c. field has to be varied simultaneously with a high-frequency field keeping a constant ratio between the amplitudes.

The invention relates to a mass spectrometer for ultra-rapid scanning by varying a d.c. field only, whereby simultaneous collection can be combined with rapid scanning.

The spectrometer according to the invention comprises a known magnetic-sector spectrometer used for simultaneous collection, in combination with an electrostatic deflector having parallel plates, the supply voltage of which is varied.

In accordance with the present invention, there is provided a mass spectrometer comprising: magnetic sector means for focussing ion species onto a focal plane, electrostatic deviator means having parallel electrodes, electrical means supplying a variable bias voltage across said electrodes, and collector means arranged for selectively receiving one of said ion species emerging from said electrostatic deviator means; said ion species forming focussed beams reaching along a line said focal plane at an angle of incidence substantially equal to 45°; one of said electrodes being provided with an elongated slit extending along said line for transmitting said focussed beams; said collector means being arranged on said line near one end of said elongated slit.

For a better understanding of the invention, and to show how the same may be carried into effect, reference will be made to the following description and the ensuing drawing which shows an embodiment of the invention. The components are shown in section. The plane of the drawing is the plane of symmetry of the gap pertaining to the magnetic sector of the spectrometer.

In the drawing, reference 1 denotes a source of ions supplied with gas from a duct. A beam of ions having the energy $U_0$ comes out of the pin point exit of the source and is applied to an electrostatic lens 2 comprising three electrodes for converting the divergent beam from the source into a beam of parallel rays reaching at normal incidence the input face of a magnetic sector 8, the central ray intercepting that input face at I.

The trace JK of the exit face of the magnetic sector 8 is shown in the drawing by a straight line which at I intersects at an angle of 45° the trace of the input face.

Under these conditions, ions having the same momentum, i.e. the same mass energy product, are focussed at a focus F, which is a small rectilinear segment perpendicular to the plane of the drawing. The trace of this segment is the aforementioned plane lies on the straight trace JK.

This focusing is performed when the trajectory followed by an ion entering the magnetic sector at I corresponds to a quarter of a circle.

When the aforementioned magnetic sector is used, the beams reach the focal plane JK at an angle of incidence of 45°.

It is known to use a sector of the aforementioned kind having a constant magnetic field, together with a number of collectors centred on the trace JK, e.g. in order to determine the numerical distribution of various ion species in a mixture, the nature of the species being specified. Such a device can be used for focusing within a wide range of masses—i.e. when the ratio of the maximum to the minimum mass is greater than 20.

An electrostatic deflector has parallel plates 4, 5. The top plate 5 is parallel to and beside the exit face of magnetic sector 8. The plate 5 has a slit which extends along the locus of foci JK, and beyond the latter.

The slit is positioned along at line JK, which is the intersection of the focal plane and the plane of symmetry of the gap pertaining to the magnetic sector. The width of the slit may be made equal to or smaller than the useful width of the gap, which is usually approximately half gap length.

Device 10 is used to apply a variable voltage between plates 4 and 5. The polarity of the voltage applied across plates 4 and 5 is selected in accordance with the polarity of the ions used, so that the force exerted on the ions is directed towards the top plate 5. The deflector comprises potential distributors 9, which help to make the field uniform. Plate 5 is grounded, and so is one of the terminals of device 10, which can be a saw-tooth generator.

The focussed beams emerging from magnetic sector 8 are fed through the slit in plate 5 into the electrostatic deflector at an angle of incidence of 45° and are re-focused by the deflector.

The ions emerging from the magnetic sector at a focus F travel along parallel paths and are re-focussed at F′ (a small rectilinear segment parallel to F). The trace of F' in the plane of the drawing lies, as before, on the prolongation of line JK.

The drawing shows the particular beam coming from the input beam when the mass energy product of the ions has the value M. $U_o$. This particular beam is focussed at F and then re-focussed by the electrostatic deflector at F', opposite the aperture of a collector 6. The drawing also shows a further particular beam focussed by the magnetic sector at $F_1$ and then by the deflector at $F'_1$. Chain lines show the beginning of the path followed by the last-mentioned particular beam in the electrostatic deflector when the electric field has a different value insuring focussing at F'. Other chain lines show the path of a still further particular beam in the magnetic sector, focussed at a place where a further collector 7 has been disposed for receiving ions directly from the magnetic sector 8.

Since the incident ions have a constant energy $U_o$, we obtain the following expressions if the distance between the plates of the electrostatic deflector is d, the voltage applied between its plates is V, the electric field in the electrostatic deflector is E, the radius of the path of an ion in the magnetic sector is R, its mass is M, the value of the magnetic field is H, the distance between focus F and the point I (the central point of entry of ions into the magnetic sector) is $L_1$ and the distance between foci F and F' is $L_2$:

$$L_2 = 4\ U_o/2E \text{ with } E = V/d \quad (1)$$

$$L_2 = 2\ U_o/dV$$

$$R = \frac{144\sqrt{M\ U_o}}{H} \text{ and } L_1 = R\sqrt{2} \quad (2)$$

$$M = \left| \frac{L_1 + L_2 - 2\ U_o d/V H}{204\sqrt{U_o}} \right|^2 \quad (3)$$

Convenient units are used, i.e. centimeters, volts and gauss.

Since the magnetic field is constant, it can be produced by a permanent magnet.

When the mass increases, the resolution increases roughly with the square root of M, which is an intermediate situation between spectrometers using only a magnetic sector (where the resolution is constant) and quadrupole spectrometers, where the resolution is approximately proportional to M.

The drawing shows only one collector 6, but of course one or more collectors 6 can be provided, corresponding to different values of $L_1 + L_2$. For example, three collectors respectively recording the mass ranges 25–75, 75–170, 170–300 can be used, if required, for the purpose of coupling to a low-resolution gaseous-phase chromatographic device.

A collector similar to collector 7 but provided with an opening, so as to receive only part of the ion beams, can be positioned downstream of the magnetic analyzer in its focal plane, so as to selectively collecting a part of the total ion flux, without collecting helium. This measurement provides excellent chromatographic detection, since it separates the selected products from helium, which is generally used as a host gas.

In addition, one or more collectors or screens can be placed between the magnetic analyzer and the electrostatic deflector, either for stopping an undesired ionic species (e.g. avoiding a major peak which may possibly saturate the detector) or for specially measuring one or more preselected compounds, in which case the other compounds (possibly present in the form of traces) are examined separately and later.

The invention is not limited to the embodiment described and shown.

The magnetic sector must simply be able to focus ionic species in a single focal plane, on which the focused beams are incident at an angle of 45°.

Since the plates of the electrostatic deflector are of course parallel to the focal plane of the magnetic sector 8, the slit plate 5 is substantially positioned in that focal plane.

What I claim is:

1. Mass spectrometer comprising: magnetic sector means for focussing ion species onto a focal plane, electrostatic deviator means having parallel electrodes, electrical means supplying a variable bias voltage across said electrodes, and collector means arranged for selectively receiving one of said ion species emerging from said electrostatic deviator means; said ion species forming focussed beams reaching along a line of said focal plane, the angle of incidence of said beams being substantially equal to 45°; one of said electrodes being provided with an elongated slit extending along said line for transmitting said focussed beams; said collector means being arranged on said line near one end of said elongated slit.

2. Mass spectrometer is claimed in claim 1, wherein said electrodes are planar and parallel to said focal plane.

3. Mass spectrometer as claimed in claim 1, wherein said magnetic sector means have an input face at an angle of substantially 45° with said focal plane; the ion species received by said input face forming a beam collimated by a lens.

4. Mass spectrometer as claimed in claim 3, wherein the axis of said collimated beam intersects said input face at a point lying in said focal plane.

* * * * *